UNITED STATES PATENT OFFICE.

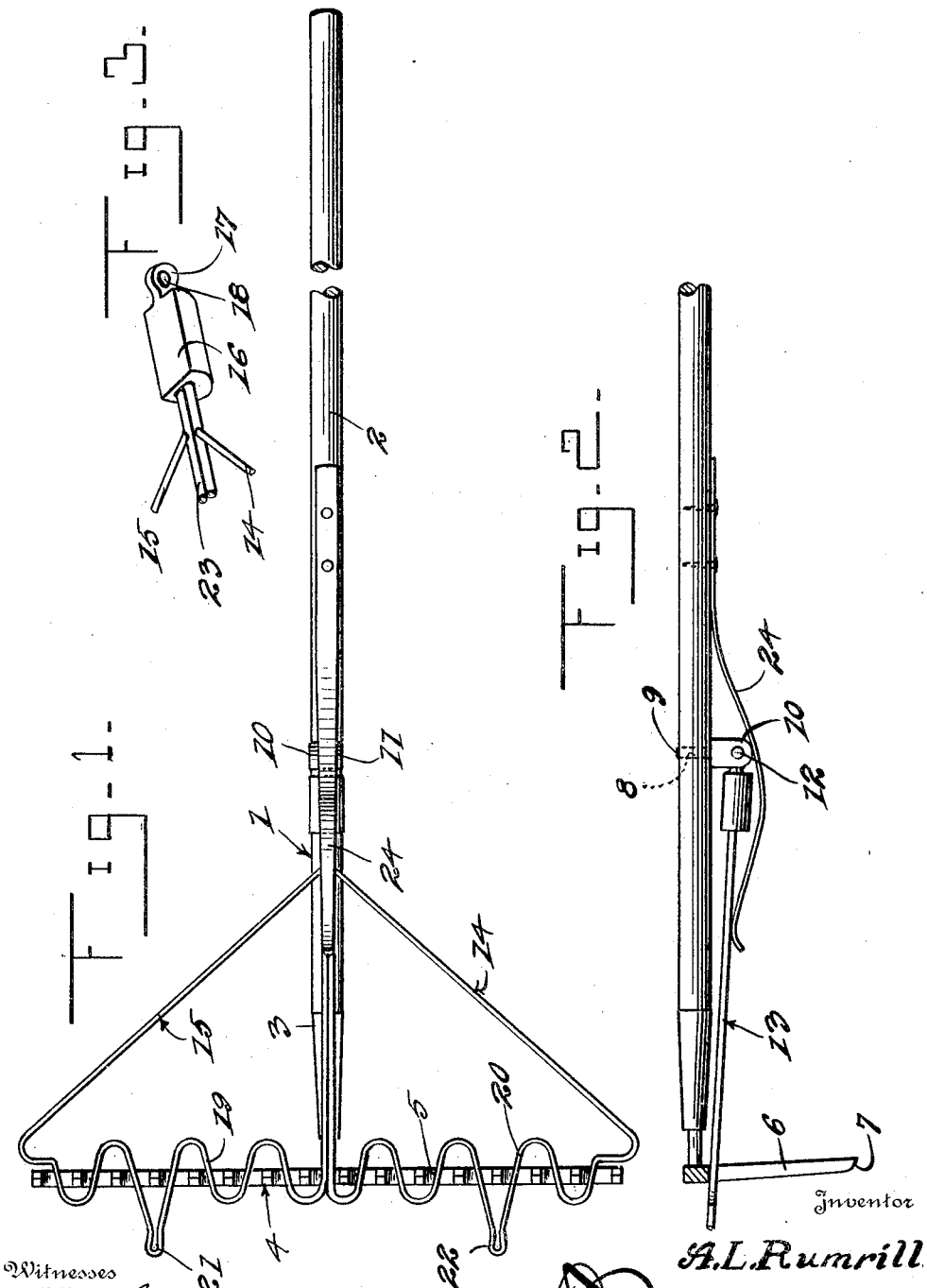

ALBERT L. RUMRILL, OF WEST SOMERVILLE, MASSACHUSETTS.

ATTACHMENT FOR RAKES.

1,108,624.  Specification of Letters Patent.  Patented Aug. 25, 1914.

Application filed February 27, 1914. Serial No. 821,467.

*To all whom it may concern:*

Be it known that I, ALBERT L. RUMRILL, a citizen of the United States, residing at West Somerville, in the county of Middlesex and State of Massachusetts, have invented certain new and useful Improvements in Attachments for Rakes; and I do hereby declare the following to be a full, clear, and exact description of the invention, such as will enable others skilled in the art to which it appertains to make and use the same.

This invention relates to new and useful improvements in attachments for rakes and similar implements which will strip the teeth of such devices of any trash or other refuse which may have gathered thereon during the process of raking.

Another object of the invention is to provide a device of the above character which may be easily and quickly applied to a rake of the usual construction without changing the same in any way.

A further object of the invention is the provision of a device which will automatically return to its normal raised position after the same has been operated to strip the rake teeth of the trash.

With the above and other objects in view this invention consists in the novel combination and arrangement of parts which will be fully set forth in the following specification and accompanying drawings, in which, Figure 1 is a bottom plan view of a rake showing the improved attachment applied thereto, Fig. 2 is a side view of Fig. 1, and Fig. 3 is an enlarged detail perspective view of the connection by means of which the device is pivotally secured to the rake handle.

Referring now more particularly to the drawings 1 designates generally a rake of the ordinary construction comprising the usual handle 2, one end of which is reduced and provided with the ordinary type of ferrule 3 to which the rake head, indicated generally by the numeral 4, is secured. The rake head above referred to preferably comprises the usual transversely extending bar 5 having formed integral therewith the spaced teeth which are sharpened at their lower extremities as clearly shown at 7.

A suitable aperture 8 is formed in the rake handle intermediate its end and is adapted to receive the pin 9, having formed integral therewith the spaced ears 10 and 11, the use of which will be more fully hereinafter described. Each of the ears 10 and 11 is provided with a transversely extending aperture through which the pin 12 is adapted to extend. The stripping member which is secured to the rake and adapted to coöperate therewith is indicated generally by the numeral 13 and preferably comprises a pair of substantially triangular members 14 and 15, which are formed of two continuous pieces of wire and bent in the shape illustrated in Fig. 1. The ends of the wires forming each of the members 14 and 15 are preferably secured within a suitable sleeve 16 having formed integral therewith the rearwardly extending ear 17 which is adapted to extend between the ears 10 and 11 and pivotally secure the member 13 in place when the device is in use. The ear 17 is preferably provided with a suitable aperture 18 for the reception of the pin 12 when the device is in use.

Each of the members 14 and 15 is provided along its forward side with a plurality of bent portions 19 and 20, which form substantially U-shaped members, which are adapted to extend between the teeth of the rake and strip the same of any trash which may have gathered thereon. Thus it will be seen that a substantially continuous stripping bar will be formed having at spaced intervals the elongated portions 21 and 22 which are bent downwardly at their free end and are adapted to provide a means to engage any object and operate the stripping bar formed by the forward sides of the members 14 and 15.

The adjacent wires of the members 14 and 15 are preferably soldered or welded together as, at 23 in Fig. 3, and are preferably provided with a longitudinal depression in which the free end of the spring 24 is adapted to slide. The spring referred to as 24 is preferably of the leaf type and is provided at its rear extremity with the flat portion which is provided with screw receiving apertures and is adapted to extend longitudinally of the rake handle when the device is in use.

It will be clearly seen from the foregoing that when it is desired to make use of the improved device the same is secured to the rake handle by the pin 9 extending through the aperture 8 and the spring 24 secured to the handle by means of the screws, indicated by the dotted lines in Fig. 2. Owing to the action of the spring against the member 13 it will be evident that the same will be held normally in the position illustrated in Fig. 2 and when the user desires to strip the teeth of any foreign matter which may have gathered thereon during the process of raking the only operation necessary is to bring one of the members 21 or 22 into engagement with a fixed object and by raising upward it will be apparent that the member 13 will descend toward the ends of the rake teeth and cause any trash or other substance which may have gathered thereon to be forced from the ends thereon. As soon as the pressure is released it will be evident that the spring will return the stripping member to its normal raised position and the process of raking may be resumed without undue inconvenience to the user.

While in the foregoing I have shown and described the preferred embodiment of my invention I wish it to be understood that I may change the specific arrangement and combination of parts without in any way departing from the spirit and scope of the invention as defined in the appended claims.

What is claimed is:—

1. In combination with a rake a cleaning device comprising a pair of triangular members secured together, the bases of each of said triangular members being bent to form a plurality of U-shaped members, each of said U-shaped members being so arranged that the arms thereof extend between the teeth of the rake, means to pivotally secure the cleaning device to the rake handle, and yieldable means to normally hold the stripping member in its raised position.

2. In combination with a rake a stripping member comprising a pair of triangular members, the base of each of said triangular members being bent to form U-shaped members, the arms of said U-shaped members extending between each of the rake teeth, one of the U-shaped members on each of the triangular members being extended to form projections by means of which the stripping element may be forced toward the ends of the rake teeth, means to pivotally secure the stripping element to the rake handle, and a leaf spring adapted to normally hold the stripping element in its raised position.

3. In combination with a rake a stripping element comprising a pair of triangular members, the adjacent sides of said triangular members being welded, a plurality of U-shaped members formed of the forward sides of the triangular members, a sleeve secured to the triangular members and pivotally secured to the rake handle, and a spring to normally hold the stripping element in its raised position.

In testimony whereof I affix my signature in presence of two wintesses.

ALBERT L. RUMRILL.

Witnesses:
WINSOR L. SNOW,
EDMUND S. SPARROW.